(12) United States Patent
Khair et al.

(10) Patent No.: US 6,718,757 B2
(45) Date of Patent: Apr. 13, 2004

(54) INTEGRATED METHOD FOR CONTROLLING DIESEL ENGINE EMISSIONS IN CRT-LNT SYSTEM

(75) Inventors: Magdi K. Khair, San Antonio, TX (US); Cynthia C. Webb, San Antonio, TX (US); Gordon J. Bartley, San Antonio, TX (US); Christopher A. Sharp, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/347,722

(22) Filed: Jan. 21, 2003

(65) Prior Publication Data

US 2003/0140621 A1 Jul. 31, 2003

Related U.S. Application Data

(60) Division of application No. 09/961,442, filed on Sep. 24, 2001, which is a continuation-in-part of application No. 09/339,080, filed on Jun. 23, 1999, now Pat. No. 6,293,096.

(51) Int. Cl.[7] .................................................. F01N 3/00
(52) U.S. Cl. .......................... 60/286; 60/274; 60/276; 60/285; 60/288; 60/295; 60/297
(58) Field of Search .................... 60/274, 276, 277, 60/285–288, 295, 297, 301, 303, 311

(56) References Cited

U.S. PATENT DOCUMENTS

| | | | |
|---|---|---|---|
| 3,757,521 A | 9/1973 | Tourtellotte et al. | 60/286 |
| 4,485,621 A | * 12/1984 | Wong et al. | 60/288 |
| 4,510,749 A | 4/1985 | Taguchi et al. | 60/288 |
| 4,902,487 A | 2/1990 | Cooper et al. | 423/215.5 |
| 5,052,178 A | 10/1991 | Clerc et al. | 60/286 |
| 5,272,871 A | 12/1993 | Oshima et al. | 60/286 |
| 5,364,606 A | 11/1994 | Hung | 423/239.2 |
| 5,412,946 A | 5/1995 | Oshima et al. | 60/303 |
| 5,471,836 A | 12/1995 | Takeshima et al. | 60/285 |
| 5,472,673 A | 12/1995 | Goto et al. | 422/169 |
| 5,519,993 A | 5/1996 | Rao et al. | 60/288 |
| 5,551,231 A | 9/1996 | Tanaka et al. | 60/301 |
| 5,570,576 A | 11/1996 | Ament et al. | 60/300 |
| 5,572,866 A | 11/1996 | Loving | 60/274 |
| 5,582,002 A | 12/1996 | Pattas | 60/274 |
| 5,611,198 A | 3/1997 | Lane et al. | 60/299 |
| 5,649,421 A | 7/1997 | Wakabayashi et al. | 60/297 |
| 5,650,127 A | 7/1997 | Campbell et al. | 423/239.1 |
| 5,653,101 A | 8/1997 | Lane et al. | 60/274 |
| 5,711,147 A | 1/1998 | Vogtlin et al. | 60/274 |
| 5,711,149 A | 1/1998 | Araki | 60/286 |
| 5,727,385 A | 3/1998 | Hepburn | 60/297 |
| 5,746,989 A | 5/1998 | Murachi et al. | 423/212 R |
| 5,750,082 A | 5/1998 | Hepburn et al. | 423/213.5 |
| 5,753,188 A | 5/1998 | Shimoda et al. | 422/108 |
| 5,783,160 A | 7/1998 | Kinugasa et al. | 423/237 |

(List continued on next page.)

OTHER PUBLICATIONS

U.S. patent application Publication 2001/0035006 dated Nov. 2001 filed by Dou et al.
U.S. patent application Publication 2001/0052232 dated Dec. 2001 filed by Hoffmann et al.

Primary Examiner—Thomas Denion
Assistant Examiner—Tu M. Nguyen
(74) Attorney, Agent, or Firm—Baker Botts L.L.P.

(57) ABSTRACT

A method for controlling diesel engine emissions is disclosed. The diesel engine's exhaust system has a $NO_x$ oxidation catalyst, a diesel particulate filter (DPF), and a lean $NO_x$ trap (LNT). The DPF is monitored to determine the need for regeneration. The LNT is monitored to determine the need for regeneration or desulfurization. A fuel injector is used to inject fuel upstream of the LNT under certain conditions, and a bypass may be used to bypass exhaust around the oxidation catalyst to provide richer or hotter exhaust to the LNT.

16 Claims, 3 Drawing Sheets

U.S. PATENT DOCUMENTS

| | | | |
|---|---|---|---|
| 5,798,270 A | 8/1998 | Adamczyk et al. | 60/297 |
| 5,809,774 A | 9/1998 | Peter-Hoblyn et al. | 60/286 |
| 5,850,735 A | 12/1998 | Araki et al. | 60/286 |
| 5,891,409 A | 4/1999 | Hsiao et al. | 60/301 |
| 5,953,907 A * | 9/1999 | Kato et al. | 60/276 |
| 5,974,791 A | 11/1999 | Hirota et al. | 60/286 |
| 6,021,639 A | 2/2000 | Abe et al. | 60/297 |
| 6,038,854 A | 3/2000 | Penetrante et al. | 60/297 |
| 6,134,883 A | 10/2000 | Kato et al. | 60/274 |
| 6,167,696 B1 | 1/2001 | Maaseidvaag et al. | 60/285 |
| 6,199,375 B1 * | 3/2001 | Russell | 60/286 |
| 6,209,316 B1 | 4/2001 | Duvinage et al. | 60/274 |
| 6,233,927 B1 * | 5/2001 | Hirota et al. | 60/297 |
| 6,293,096 B1 * | 9/2001 | Khair et al. | 60/295 |
| 6,615,580 B1 * | 9/2003 | Khair et al. | 60/286 |

* cited by examiner

INTEGRATED METHOD FOR CONTROLLING DIESEL ENGINE EMISSIONS IN CRT-LNT SYSTEM

RELATED APPLICATION

This application is a divisional application of application Ser. No. 09/961,442 filed Sep. 24, 2001, entitled "Integrated System for Controlling Diesel Engine Emissions" which is a continuation-in-part application of application Ser. No. 09/339,080 filed Jun. 23, 1999, entitled, "Multiple Stage Aftertreatment System", now U.S. Pat. No. 6,293,096.

TECHNICAL FIELD

This invention relates generally to emission control for internal combustion engines, and more particularly to a control system for diesel engines that provides integrated control of engine and post-combustion emission control devices, the latter including both DPF and LNT devices.

BACKGROUND OF THE INVENTION

New emission limits call for major reductions in oxides of nitrogen ($NO_x$) and particulate matter (PM) emissions from diesel engines. Engine manufacturers have developed systems for exhaust gas recirculation (EGR), and diesel particulate filters (DPF) to achieve low $NO_x$/PM emissions. The use of DPFs has been found to reduce PM below the stringent requirements of the new emission standards proposed for the 2005 through 2010 time frame. However, $NO_x$ emissions are still six to eight times higher than the proposed standards for model year 2007.

To achieve the target $NO_x$ emission levels, new post-combustion devices are being experimented with. These devices include selective catalytic reduction (SCR) using urea or ammonia as reductant, and lean $NO_x$ traps (LNT) (otherwise known as $NO_x$ adsorbers) using hydrocarbon as reductant. Although SCR systems have been used in stationary applications for several years they are now being developed for the mobile fleet with good success. However, greater $NO_x$ reduction than SCRs can deliver is still hoped for and the LNT system promises to achieve the desired $NO_x$ conversion efficiency.

SUMMARY OF THE INVENTION

The invention is directed to methods and systems for controlling diesel engine emissions. In all embodiments, the diesel engine's exhaust system has at least a diesel particulate filter (DPF) and a lean $NO_x$ trap (LNT). The DPF may be one of two types: a first type that uses a catalyzed soot filter or a second type that uses a continuously regenerated trap. In either case, the LNT is monitored to determine the need for regeneration or desulfurization. In the former case, the catalyzed soot filter is also monitored to determine the need for regeneration. A fuel injector is used to inject fuel upstream of the LNT under certain conditions, and a bypass may be used to bypass exhaust upstream of the LNT to provide richer or hotter exhaust to the LNT. The sensor outputs and controls for providing the appropriate heat or fuel mix for regeneration and desulfurization may be controlled with enhancements to existing engine control circuitry.

Features of the invention include the capability of integration of engine controls with control of post combustion emission control devices. Intake throttling, existing EGR systems, and post-combustion injection can be used, alternatively or in combination, for the purpose of regenerating the LNT. Existing EGR can be used to reduce $NO_x$ without adversely affecting the ability to maintain low PM emissions. A portion of the exhaust can be diverted to assist in creating a stoichiometric air-to-fuel ratio at the inlet of the LNT to facilitate regeneration. Overall, the system performs all of the above while not affecting drivability.

DETAILED DESCRIPTION

Tri-Stage Aftertreatment Device

U.S. patent application Ser. No. 09/339,080, entitled "Multiple Stage Aftertreatment System" to Khair, et al., now U.S. Pat. No. 6,293,096, and assigned to Southwest Research Institute, describes an aftertreatment system for reducing the amount of nitrogen oxide and particulate matter in engine exhaust gases without the need for electric heating elements to increase the temperature of the exhaust gas to periodically regenerate the particulate filter. The aftertreatment system does not require the injection of additional fuel in each cylinder of the engine to provide additional necessary hydrocarbon to reduce the $NO_x$ to $N_2$ (nitrogen). It has an internal bypass for the $NO_2$ trap to control the rate of $NO_2$ directed to the carbon trap.

Figure 1:
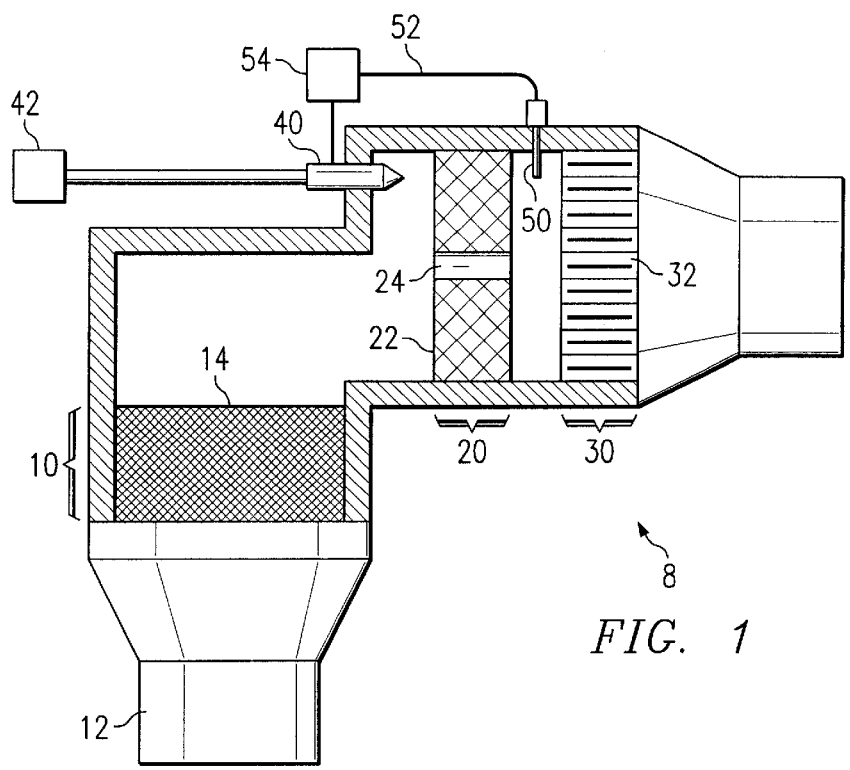
FIG. 1 illustrates a first embodiment of a multiple stage aftertreatment system.

A first preferred embodiment of the aftertreatment system is generally indicated by reference numeral 8 in FIG. 1, and effectively combines the functions of a CRT (catalytically regenerated trap), a LNT (lean $NO_x$ trap), and a carbon trap in a single system for the reduction of both $NO_x$ (nitrogen oxides) and PM (particulate matter) emissions. The aftertreatment system 8 is particularly adapted to operate in lean air-fuel ratio engines, such as diesel engines, and uses the excess oxygen present in the exhaust stream of such lean burn engines to reduce the amount of $NO_x$ and carbonaceous particulate matter discharged into the atmosphere. The main elements of aftertreatment system 8 are a first stage 10, a second stage 20, a third stage 30, and a hydrocarbon fuel injector 40 interposed between the first stage 10 and the second stage 20.

The first stage 10 has an inlet 12 which is adapted to receive exhaust gases discharged from an internal combustion engine, such as a diesel engine (not shown). Typically, the exhaust gas from a diesel engine contains various oxides of nitrogen ($NO_x$) and particularly NO (nitric oxide) and $NO_2$ (nitrogen dioxide), as well as HC (hydrocarbons), CO (carbon monoxide), $CO_2$ (carbon dioxide), PM (particulate matter), and other products of the combustion process. The first stage 10 of the aftertreatment system includes an oxidation catalyst 14, preferably a noble metal such as platinum or palladium. The catalyst 14 oxidizes the NO in the exhaust gas stream, in the presence of the catalyst, to $NO_2$. This reaction is represented by Formula 1:

$$NO + \tfrac{1}{2}O_2 \rightarrow NO_2 \qquad 1)$$

Thus, $NO_2$ (nitrogen dioxide) is formed and is carried into the second stage 20 of the aftertreatment system 8.

The second stage 20 of the aftertreatment system 8 includes a first portion 22 and a second portion 24. The first portion 22 contains a lean $NO_x$ trap (LNT). The lean $NO_x$ trap stores $NO_2$ under lean fuel-air mixture (i.e., oxygen-rich) engine operation, then reduces the stored $NO_2$ to $N_2$ and $O_2$ under rich fuel-air conditions. In most diesel applications, rich fuel-air conditions do not frequently occur during normal over-the-road or other relatively steady state operation. The portion of the $NO_2$ stored in the LNT 22 of the second stage 20 combines with the supplemental HC provided by the periodic injection of supplemental HC (hydrocarbon fuel) upstream of the second stage 20 to form $N_2$, $H_2O$ and $CO_2$. The reduction of $NO_2$ in the second stage is represented by Formula 2:

$$NO_2 + HC + O_2 \rightarrow N_2 + H_2O + CO_2 \qquad 2)$$

With continued reference to FIG. 1, the hydrocarbon fuel injector 40 is in fluid communication with a source 42 of pressurized hydrocarbon fuel, for example diesel fuel such as that used in the normal operation of the engine. The reduction conversion efficiency of $NO_2$ to $N_2$ and $O_2$ in the second stage is typically somewhat less than 100% and therefore, some $NO_2$ is expected to escape the LNT 22 and pass on to the third stage 30. Another portion of the $NO_2$ formed in the first stage 10 bypasses the LNT 22 of the second stage by being directed through the second portion bypass 24 of the second stage 20. The size of the bypass 24 can be readily determined by experimentation for specific applications to ensure good $NO_x$ and PM emission reduction.

The third stage 30 of the aftertreatment system 8 in the first embodiment of the present invention includes a carbon trap oxidizer 32 such as a ceramic cordierite wallflow trap. In the carbon trap oxidizer 32, the $NO_2$ reacts with carbon in the trap and forms $CO_2$ and $N_2$. Thus, the unconverted $NO_2$ from the first portion 22 of the second stage 20, as well as bypassed $NO_2$ passing through the second portion 24 of the second stage 22, is reduced to nitrogen and $CO_2$ and is represented below by Formula 3:

$$2NO_2 + 2C \rightarrow N_2 + 2CO_2 \qquad 3)$$

Thus, in the first stage 10 of the multiple stage aftertreatment system 8, NO resulting from the diesel combustion process combines with excess oxygen in the exhaust gas stream to form $NO_2$, aided by the catalyst 14 in the first stage 10. In the second stage 20, a lean $NO_x$ trap stores the $NO_2$ formed by the oxidation catalyst 14 of the first stage 10. The stored $NO_2$ then combines with supplemental HC, injected by the injector 40 to form $N_2$, $H_2O$, and $CO_2$. Unconverted as well as bypassed $NO_2$ then proceed to the carbon trap oxidizer 32 of the third stage 30, where $NO_2$ is reduced to $N_2$ and carbon is oxidized to $CO_2$, $NO_2$ is stored in the LNT portion 22 of a second stage 20 as long as the exhaust is lean (oxygen-rich). As the LNT portion 22 reaches its $NO_2$ storage capacity limits, the fuel injector 40, positioned just upstream of the LNT portion 22, delivers supplemental hydrocarbon in the form of diesel fuel, thereby reducing $NO_2$ to $N_2$.

Switching from the $NO_2$ storage mode to the reducing mode is preferably controlled by the use of a $NO_x$ sensor 50 positioned in the exhaust downstream of the second stage 20, and preferably between the second stage 20 and the third stage 30. The $NO_x$ sensor 50 senses the $NO_x$ content of the exhaust stream and is thereby capable of indirectly detecting engine load. The $NO_x$ sensor 50 delivers an electrical signal 52 to a programmable controller 54 which conditions the electrical signal 52 and controls the operation of the hydrocarbon fuel injector 40. Thus, fuel can be controllably injected into the aftertreatment system 8 under desired engine operating conditions to enhance the performance of the LNT portion 22 of the second stage. An alternative to sensing $NO_x$ is measuring exhaust gas temperature for use as an indicator of engine speed and load. $NO_x$ formation in diesel engines is a function of engine temperature, generally increasing as the combustion temperature increases, and thus it can be inferred that $NO_x$ formation is taking place at a high rate under high temperature engine operating conditions. At such times, supplemental diesel fuel can be injected to reduce the $NO_x$ emissions. It is desirable that the fuel used for engine operation be a low sulfur fuel to prevent damage to catalysts in the system.

Figure 2:
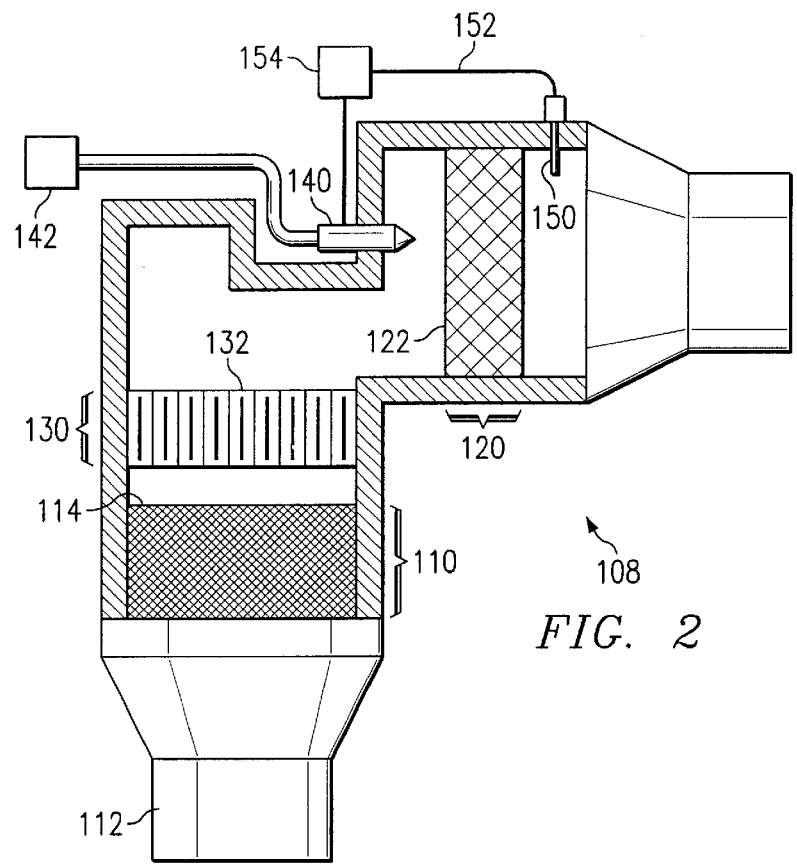
FIG. 2 illustrates a second embodiment of a multiple stage aftertreatment system.

A second embodiment of the aftertreatment system is indicated by reference numeral 108 in FIG. 2. In the second embodiment, the lean $NO_x$ trap and carbon trap are reversed with respect to their positions in the first embodiment, but still effectively produce the same desirable reduction in both $NO_x$ and particulate matter in the exhaust emission stream. As in the first embodiment, the first stage 110 includes an oxidation catalyst 114 positioned just downstream of an inlet 112. The catalyst 114 oxidizes the NO in the exhaust stream in the presence of the catalyst, to $NO_2$. Thus, the reaction that takes place in the first stage of the second embodiment is the same as that shown in Formula 1 above.

In the second embodiment, the second stage 130 includes a carbon trap oxidizer 132, such as a ceramic cordierite wallflow trap. In the carbon trap 132, $NO_2$ in the gas stream discharged from the first stage reacts with the carbon component of the carbonaceous particulate matter in the exhaust gas stream, reducing at least a portion of the $NO_2$ to $N_2$ and simultaneously oxidizing the carbon to form carbon dioxide ($CO_2$). The amount of $NO_2$ reduced is dependent upon the amount of carbon present, and therefore, the reduction of $NO_2$ to $N_2$ may not be 100%. That is, the exhaust gas stream discharged from the second stage 132 usually will contain both reduced $NO_2$ ($N_2$) and oxidized carbon ($CO_2$) as well as some residual nitrogen dioxide ($NO_2$), as represented below by Formula 4:

$$2NO_2 + 2C + NO_2 \rightarrow N_2 + 2CO_2 + NO_2 \qquad 4)$$

With continued reference to FIG. 2, the third stage 120 includes a lean $NO_x$ trap (LNT) 122. The gas stream emitted from the second stage 130, containing nitrogen, carbon dioxide and a remaining portion of nitrogen dioxide passes through the third stage 120. The third stage lean $NO_x$ trap is arranged to store the remaining portion of the nitrogen dioxide discharged from the second stage, and with the addition of a supplemental hydrocarbon fuel, reduce the stored nitrogen dioxide to nitrogen, water in a gaseous state, and carbon dioxide, and discharge a gaseous stream from the multiple stage aftertreatment system 108 that consists essentially of nitrogen, water and carbon dioxide. This reaction is represented above by Formula 2.

Aftertreatment system 108 has a hydrocarbon fuel injector 140 that is positioned between the second stage 130 and the third stage 120 at a position adapted to controllably inject selected amounts of hydrocarbon fuel, from a pressurized source 142, into the gaseous stream discharged from the second stage 130, prior to the gaseous stream being received by the third stage 120. As described above, the lean $NO_x$ trap 122 stores the remaining portion of the $NO_2$ then combines the stored $NO_2$ with supplemental HC, injected by the injector 140 to form $N_2$, $H_2O$ and $CO_2$. $NO_2$ is stored in the lean NO trap portion 122 of the third stage 120 when the exhaust is lean (oxygen-rich). As the lean $NO_x$ trap portion 122 reaches its $NO_2$ storage capacity limits, the fuel injector 140, positioned just upstream of the lean $NO_x$ trap 122 delivers supplemental hydrocarbon (HC) in the form of diesel fuel, thereby inducing $NO_2$ reduction to $N_2$.

Switching the $NO_2$ from the storage mode to the reducing mode may be controlled, as described above, by the use of a $NO_x$ sensor 150 positioned in the exhaust downstream of the third stage 120. The $NO_x$ sensor 150 senses the $NO_x$ content of the exhaust stream and is thereby capable of indirectly determining engine load. The $NO_x$ sensor 150 delivers an electrical signal 152 to a programmable controller 154 which conditions the electrical signal 152 and controls the operation of the hydrocarbon fuel injector 140. Thus, fuel can be controllably injected into the aftertreatment system 108 under desired engine operating conditions to enhance the performance of the lean $NO_x$ trap portion 122 of the third stage 120.

The multiple stage aftertreatment devices described above combine the functions of a catalytically regenerated trap (CRT) with a lean $NO_x$ trap (LNT) in a single system for the reduction of both $NO_x$ and PM emissions. This effectively maximizes the common features of both systems, such as a noble metal catalyst and its $NO_2$ formation capability.

Integrated Systems for Diesel Engine Control

The following description is directed to the integration of an emission control system consisting of a diesel engine equipped with an EGR and intake throttle, and capable of post-injection, with post-combustion exhaust emission control devices. The emission control devices in the exhaust are a DPF, LNT, supplemental fuel (reductant) injector, and a bypass valve. The tri-stage concepts discussed above are integrated into the overall engine emission control system.

Figure 3:
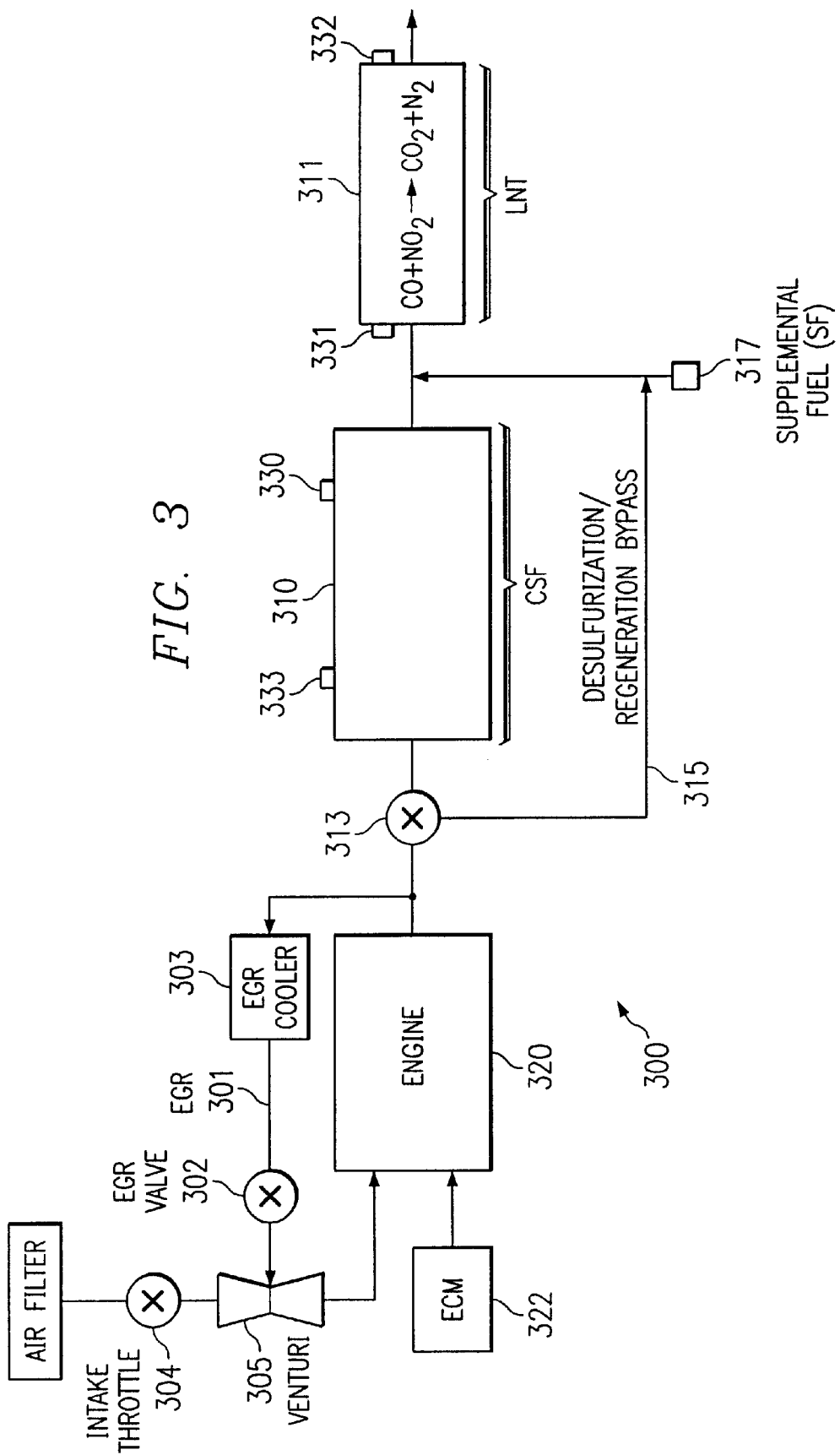
FIG. 3 illustrates a $NO_x$ and PM reduction system having a CSF-LNT unit in the exhaust path.

Two categories of control systems are discussed, each using a different DPF system. A first system uses a Catalyzed Soot Filter (CSF), whereas a second system uses a Continuously-Regenerated Trap (CRT™). The following description describes two systems: a CSF-LNT system and a CRT-LNT system. Both systems have at least seven features that interact to facilitate control of the regeneration and/or desulfurization of the emissions components:

1) Intake air throttling
2) A venturi used to enhance EGR flow
3) Cooled EGR System
4) Post combustion fuel injection (in-cylinder and/or in exhaust)
5) A bypass valve in the exhaust stream to direct flow during desulfurization
6) Placement of the supplemental fuel injector in the exhaust
7) Embedded software that contains integration and control logic CSF-LNT Configuration and Control FIG. 3 illustrates the CSF-LNT system 300, which has the engine controls noted above (i.e., EGR line 301, EGR valve 302, EGR cooler 303, intake throttle 304, intake venturi 305, electronic engine controls 322). The exhaust system has a CSF 310, an LNT 311, a bypass valve 313, and a fuel injector 317, as well as CSF pressure and temperature sensors 330 and 333, and LNT $NO_x$ sensors 331 and 332. Sensor 330 monitors CSF dP (pressure drop), and sensors 331 and 332 monitor $NO_x$ levels before and after the LNT 311.

As explained below, the monitoring sensors 330–333 are used to determine the need for regeneration of both systems. Their output signals may be delivered to engine controller 322, which performs appropriate algorithms for implementing the regeneration and desulfurization described below, including control of various engine and exhaust devices so as to enhance conditions for regeneration and desulfurization.

CSF 310 may be any device that acts as a particulate filter, wherein part or all of the surface of the filter is "catalyzed" (i.e., coated with catalytically active materials). NO in the exhaust is oxidized to $NO_2$ on the catalyzed surfaces of the filter, and the $NO_2$ then oxidizes the carbon trapped on the filter. For the rate of regeneration to exceed the rate of trapping in the CSF 311 (i.e., the CSF can clean out any accumulated soot particles), the temperature must generally exceed 380° C. If long periods of operation are performed below this temperature (for example sustained idle or light load operation), it may be necessary to artificially elevate the temperature of the CSF 310 for a period of time to clean it.

A bypass valve 313 is incorporated upstream of the CSF 310 to allow a small portion of the exhaust to be routed around the CSF 310, via a bypass line 315, and reintroduced into the exhaust upstream of the LNT 311. A supplemental fuel injector (SFI) 317 is located in the exhaust between the CSF 310 and LNT 311 to allow for injection of additional fuel to supplement the air-to-fuel ratio of the exhaust entering the LNT 311. All of these systems are controlled from the electronic control module (ECM) 322.

Under normal operation, all of the engine exhaust passes first through the CSF 310 and then through the LNT 311. The CSF 310 traps insoluble particulates and oxidizes volatile organic particulates. In addition, if the temperature is high enough (over 380° C.) some of the $NO_2$ generated by the CSF 310 removes carbon particles already trapped in the CSF 310. Excess $NO_2$ from CSF 310 is stored on LNT 311. The exhaust flows enters the LNT 311, where any remaining NO is oxidized to $NO_2$. The $NO_2$ then adsorbs on the surface of the LNT.

When the CSF 310 differential pressure indicates that regeneration is needed, and the temperature of the CSF 310 is not at the required level, the exhaust temperature is increased using control strategies programmed into the ECM 322. This may be done using intake throttle 304, increased EGR rate, or in-cylinder post-combustion fuel injection while the exhaust valves are open (referred to as post-injection). Intake throttling or increased EGR rate increases the exhaust gas temperature from the engine 320. Post-injection increases the CSF temperature by using the exothermic heat generated by the oxidation of the post-injected fuel. These methods may be used separately or in combination, and may be optimized to produce the highest temperature for the smallest amount of performance and fuel penalty.

When $NO_x$ monitors at the inlet and outlet of the LNT 311 indicate that $NO_x$ reduction across the LNT 311 has fallen below acceptable levels, regeneration and/or desulfurization will be needed. LNT regeneration requires temperatures above 250° C. and a stoichiometric or slightly rich exhaust gas air-to-fuel ratio. If temperature is not sufficient for regeneration, it may be increased using any or a combination of the methods described above for increasing the CSF temperature.

To generate the rich exhaust gas air-to-fuel ratio, a variety of methods may be used. Intake throttling and increased EGR will generate higher CO levels in the exhaust. The bypass valve 313 may be used to pass a portion of this CO laden exhaust around the CSF 310 (which would otherwise oxidize and remove the CO), thus moving the exhaust closer to a rich condition upstream of the LNT 311. Post-injection could also be used to add more fuel into the exhaust, again in conjunction with the bypass valve 313. Some of the post-injected fuel may also make it through the CSF (or be partially oxidized to generate CO by the CSF) depending on exhaust gas temperature and flow rate. Finally, fuel injector 317 may be used to inject additional fuel into the exhaust upstream of the LNT 311 to ensure the rich exhaust conditions needed for regeneration. Any combination of these may be used, and the regeneration strategy may be optimized to achieve the fastest and most complete regeneration for the least amount of fuel economy and performance penalty.

If, after a period of regeneration, the $NO_x$ sensors indicate that $NO_x$ reduction across the LNT 311 has still not returned to acceptable levels, then a need for desulfurization is indicated. Desulfurization requires temperatures between 400° C. and 600° C., with higher temperatures requiring a shorter period of time to complete desulfurization. This increased temperature may be accomplished by any or a combination of the means described above for the CSF 310. In addition, the bypass valve 313 may be used to pass some of the hot exhaust around the CSF 310 and into the LNT 311 in order to prevent some of the heat from being lost to the CSF. Finally, the fuel injector 317 may be used to generate heat in the LNT 311 by using the exothermic heat caused by oxidation of the injected fuel over the LNT itself. Any combination of these may be used, and the desulfurization strategy may be optimized to achieve the fastest and most complete desulfurization for the least amount of fuel economy and performance penalty. Desulfurization may be halted periodically to check if $NO_x$ reduction has returned to acceptable levels, and can be resumed if the check indicates more desulfurization is needed. If desulfurization is unsuccessful after several attempts, a problem with the LNT 311 could be indicated.

Balancing the above-described regeneration and desulfurization requirements calls for an integrated control strategy. Areas where several requirements overlap can be exploited to accomplish these tasks simultaneously (e.g., temperature increase episode for CSF regeneration can also be used for LNT regeneration and/or desulfurization) to reduce the overall fuel economy and performance penalties associated with such operation. In addition, episodes where exhaust temperatures and flow rates are ideal for regeneration can be exploited by using any of these techniques (e.g., post-injection during deceleration events, to allow a brief period of regeneration without affecting driveability).

CRT-LNT Configuration and Control

Figure 4:
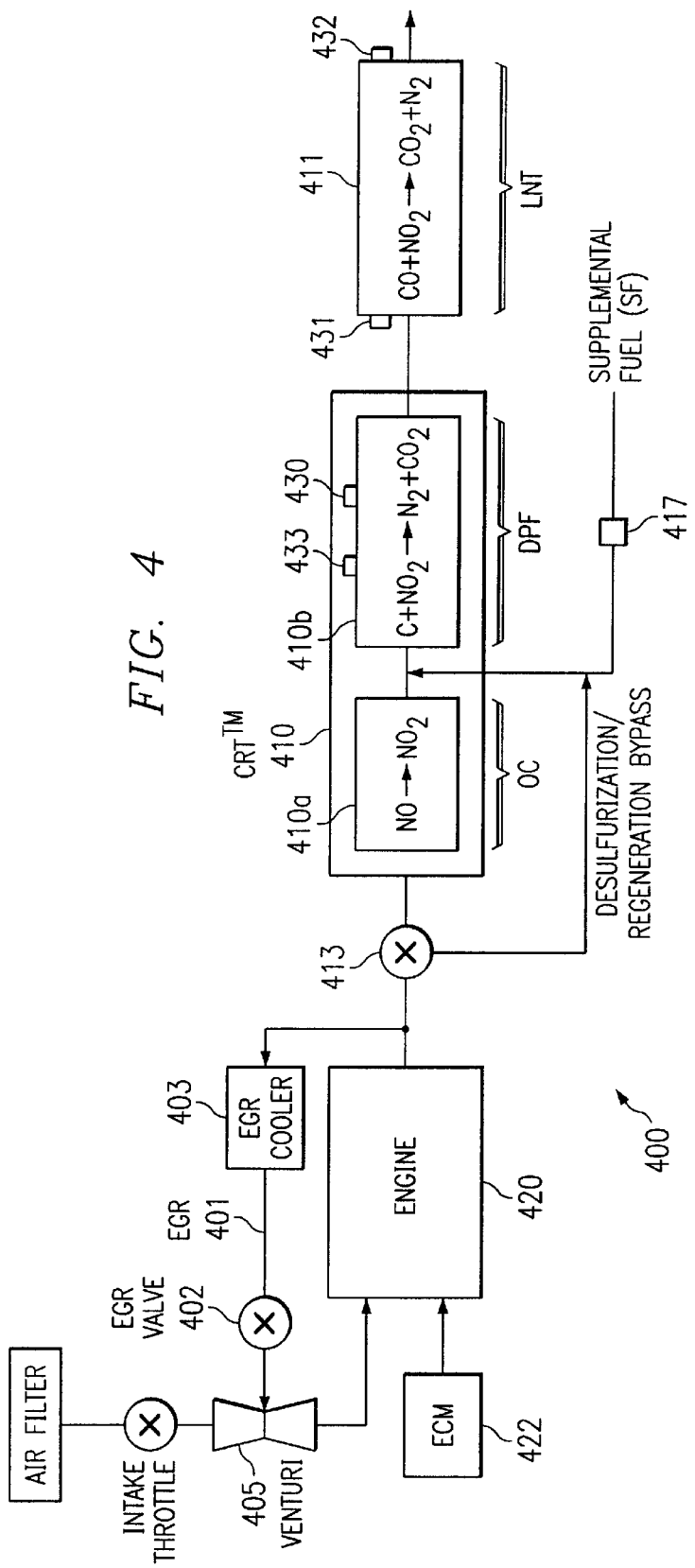
FIG. 4 illustrates a $NO_x$ and PM reduction system having a CRT-LNT unit in the exhaust path.

FIG. 4 illustrates another embodiment of an integrated system, a CRTTM-LNT system 400, which has the engine 420 and engine controls noted above (i.e., EGR line 401, EGR valve 402, EGR cooler 403, intake throttle intake venturi 405, electronic engine controls 422). As explained above CRT 410 is an alternative to the CSF of system 300, and both devices have a LNT. The configuration of the system 400 is such that the bypass control valve 413 is placed upstream of the oxidation catalyst (OC) 410*a* and is configured so as to bypass the OC 410*a*. The next emissions component in the exhaust flow is the DPF 410*b*, followed by the LNT 411. Together the OC 410*a* and DPF 410*b* make up the CRTTM 410.

CRT 410 may be any device that converts NO to $NO_2$ in a first step, followed by a wallflow DPF where carbonaceous particulate is accumulated. LNT 411 may be any device that has an oxidation catalyst to oxidize nitric oxide (NO) to nitrogen dioxide ($NO_2$), followed by an $NO_2$ trap (usually a base-metal oxide) wherein $NO_2$ is adsorbed on the surface. Temperature and pressure sensors 430 and 433 are placed at the DPF 410*b* to determine the need for DPF regeneration, and $NO_x$ sensors 431 and 432 are used to determine the need for regeneration and desulfurization of the LNT 411. Regeneration and desulfurization conditions are determined in a manner similar to the methods described above in connection with system 300.

The LNT 411 is periodically regenerated under conditions of sufficient temperature and stoichiometric (or slightly rich) exhaust air-to-fuel ratio. In addition to regeneration, the LNT 411 is "desulfurized" periodically. This is necessary because sulfur (in the form of sulfur trioxide) adsorbs in the surface of the LNT 411, blocking the sites used to trap $NO_2$ and thus reducing the efficiency of the LNT. Desulfurization requires high temperature (400° C. to 600° C.) for a sustained period of time (often several minutes—much more time than required for regeneration), and stoichiometric or slightly rich air-to-fuel ratio conditions.

Referring to FIG. 4, system 400 operates in the following manner. The OC 410*a* converts NO to $NO_2$ in the exhaust stream. The exhaust then flows through the DPF 410*b*, where PM in the exhaust is trapped and the carbon is reacted with $NO_2$ to form elemental nitrogen and carbon dioxide ($CO_2$). Excess $NO_2$ emitted from the DPF 410*b* is stored on the LNT 411, until the LNT is regenerated.

To integrate the CRT™-LNT system 400, software logic is added to the engine controller 422 to monitor the system status and to control the regeneration/desulfurization of the emissions systems as needed. For the LNT 411, $NO_x$ sensors 431 and 432 are monitored and their locations strategically determined, to develop a strategy for indicating when regeneration of the LNT 411 is required. An additional strategy monitors regeneration frequency and deciphers whether a regeneration or desulfurization is required. Once the condition for regeneration/desulfurization is met, an engine control strategy is used to create a rich condition, with adequate carbon monoxide (CO) to initiate regeneration in the $NO_x$ trap. To achieve this goal, intake throttling (to increase the vacuum across the venturi 405, resulting in increased EGR) may be used to create a richer in-cylinder air-to-fuel ratio (increasing CO in the exhaust), the bypass valve 413 may be partially activated to prevent the consumption of the excess CO across the OC 410*a*, and in-exhaust (or in-cylinder post combustion) supplemental fuel injection (SFI) 417 will be used to further raise CO and to increase the exhaust temperature to regenerate the LNT 411. Additional logic may be programmed into the controller 422 to verify that the duration of regeneration/desulfurization event was adequate to achieve complete regeneration. CO emitted during DPF regeneration will also help regenerate the LNT 411.

The control logic also monitors and controls the regeneration of the DPF 410*b*. For the DPF 410*b*, filter pressure drop (dP) and inlet exhaust temperature are monitored with pressure and temperature sensors 430 and 433. A strategy is developed to determine when regeneration is necessary. Ideally, the regeneration strategy achieves continuous regeneration through engine management, and avoids cyclic regeneration. The strategy for continuous DPF regeneration involves identifying the balance point temperature (BPT) (the temperature at which the rate of soot accumulation is equal to the rate of regeneration), predicting in real-time whether the DPF is at or below the BPT, and continuously adjusting in-cylinder, post combustion fuel injection characteristics in an attempt to maintain BPT.

Other Embodiments

Other aspects, features and advantages of the present invention can be obtained from a study of this disclosure together with the appended claims.

What is claimed is:

1. A method of reducing the amount of $NO_x$ and carbonaceous particulate matter in exhaust from an internal combustion engine, the method comprising:

receiving the exhaust into a first stage, the first stage having a $NO_x$ oxidation catalyst adapted to oxidize the nitric oxide to nitrogen dioxide and discharge exhaust;

positioning a second stage in fluid communication with said first stage and adapted to receive said exhaust from said first stage, said second stage having a carbon trap adapted to store carbonaceous particulate material contained in the exhaust, and to discharge a gaseous stream containing at least nitrogen and carbon dioxide;

interposing a bypass valve between the engine and the first stage, operable to bypass a portion of the exhaust around the first stage and upstream the second stage;

positioning a third stage in fluid communication with said second stage and adapted to receive said exhaust from said second stage, said third stage having a lean $NO_x$ trap adapted to store nitrogen dioxide discharged from said second stage, and to reduce at least a portion of the nitrogen dioxide;

sensing when regeneration of the second stage is to be performed;

regenerating the second stage, wherein regeneration of the second stage occurs without bypass of the first stage;

sensing when regeneration of the third stage is to be performed regardless whether the step of regenerating the second stage is performed; and bypassing at least a portion of the exhaust around the first stage in response to the step of sensing when regeneration of the third stage is to be performed;

during the bypassing step, regenerating the third stage;

wherein regeneration of the third stage may occur even if the second stage does not require regeneration.

2. The method of claim 1, further comprising the step of interposing a hydrocarbon fuel injector between the first and second stages.

3. The method of claim 1, further comprising the step of sensing differential pressure at the second stage to determine the need for regeneration of the second stage.

4. The method of claim 1, further comprising the step of sensing temperature at the second stage to determine the need for regeneration of the second stage.

5. The method of claim 1, further comprising the step of regenerating the second stage by raising the temperature at the carbon trap.

6. The method of claim 1, further comprising the step of sensing $NO_x$ reduction across the third stage to determine the need for regeneration of the third stage.

7. The method of claim 1, wherein reaenerating the third stage is performed by raising temperature at the third stage.

8. The method of claim 1, further comprising the step of sensing $NO_x$ reduction across the third stage to determine the need for desulfurization of the third stage.

9. The method of claim 1, further comprising the step of desulfurizing the third stage by raising temperature at the third stage.

10. The method of claim 1, wherein the step of regenerating the third stage is performed by injecting fuel upstream of the second stage and downstream of the first stage.

11. The method of claim 1, wherein the third stage is regenerated by one or more of the following operations: intake throttling, increased exhaust gas recirculation, or post-combustion fuel injection.

12. The method of claim 1, wherein the first stage and second stage form a continuously regenerating carbon trap.

13. The method of claim 1, wherein regenerating the third stage is performed by increasing carbon monoxide at the third stage.

14. The method of claim 1, further comprising the step of continuously regenerating the second stage.

15. The method of claim 14, wherein the step of continuously regenerating is in response to monitoring the balance point temperature at the second stage.

16. The method of claim 14, wherein the regenerating is performed by adjusting the air-fuel ratio in the exhaust.

* * * * *